No. 790,349. PATENTED MAY 23, 1905.
R. N. DYER.
VARIABLE SPEED GEARING.
APPLICATION FILED JAN. 15, 1901. RENEWED OCT. 26, 1904.

Witnesses:
Jas. F. Coleman
Archibald G. Reese

Inventor
Richard N. Dyer
By Dyer Edmonds & Dyer
Att'ys.

No. 790,349. PATENTED MAY 23, 1905.
R. N. DYER.
VARIABLE SPEED GEARING.
APPLICATION FILED JAN. 15, 1901. RENEWED OCT. 26, 1904.

Witnesses:
Jas. F. Coleman
Archibald S. Reese

Inventor
Richard N. Dyer
By Dyer Edmonds & Dyer
Att'ys

No. 790,349. PATENTED MAY 23, 1905.
R. N. DYER.
VARIABLE SPEED GEARING.
APPLICATION FILED JAN. 15, 1901. RENEWED OCT. 26, 1904.

Witnesses:
Jas. F. Coleman
Archibald R. Reese

Inventor
Richard N. Dyer
By Dyer Edmonds & Dyer
Att'ys

No. 790,349. PATENTED MAY 23, 1905.
R. N. DYER.
VARIABLE SPEED GEARING.
APPLICATION FILED JAN. 15, 1901. RENEWED OCT. 26, 1904.

Witnesses:
Jas. F. Coleman
Archibald R. Reese

Inventor
Richard N. Dyer
By Dyer Edmonds & Dyer
Att'ys.

No. 790,349. Patented May 23, 1905.

UNITED STATES PATENT OFFICE.

RICHARD N. DYER, OF EAST ORANGE, NEW JERSEY.

VARIABLE-SPEED GEARING.

SPECIFICATION forming part of Letters Patent No. 790,349, dated May 23, 1905.

Application filed January 15, 1901. Renewed October 26, 1904. Serial No. 230,029.

*To all whom it may concern:*

Be it known that I, RICHARD N. DYER, a citizen of the United States, residing at East Orange, in the county of Essex and State of New Jersey, have invented a certain new and useful Improvement in Variable Gearing, of which the following is a description.

My invention relates to variable gearing of the type described in my Patent No. 611,378, granted September 27, 1898, wherein gears of different diameters are brought successively into action without interruption in the transmission of power through the gearing.

The invention consists in the several features of novelty hereinafter described, and pointed out by the claims.

Referring particularly to Figs. 1 to 13, inclusive, A and B are the driving and driven shafts, which carry the driving and driven wheels 1 2, secured to such shafts and having a fixed separation from each other, both parallel with the axes of the shafts and perpendicular thereto. D is the cone-shaft, which is carried by a rectangular frame E, hung upon the controlling-shaft F, located centrally above and between the driving and driven shafts, so that the cone-shaft D is located between the driving and driven shafts and in the same horizontal plane with said shafts and is parallel therewith. The frame E is capable of swinging freely upon the shaft F. The cone-shaft D is fixed against rotation in the frame E. Upon the shaft D is mounted, so as to be free to both turn and slide thereon, a sleeve G, which I call the "cone-sleeve," and upon this sleeve G are mounted two cones H I of concentric and eccentric toothed wheels, which engage with the driving and driven wheels. These two cones are placed, preferably, with their bases toward each other and are secured to the cone-sleeve so as to turn therewith. The concentric and eccentric toothed wheels of the two cones are the same in size and arrangement, so that the radial differences between adjacent concentric wheels on one cone will be the same as on the other cone. The two or more steps in each cone are also preferably the same, so that the swinging movements of the cone for all speed adjustments will be the same in extent. The driving-wheel 1 engages with one side of the wheels of the cone H, while the driven wheel 2 engages with the other side of the wheels of cone I. It will be understood by reference to my patent already referred to that the eccentric toothed wheels of the cones are located between the concentric wheels and form means for carrying the driving and driven wheels from one concentric to another concentric wheel without breaking the mesh of the teeth, and in order to do this it will also be understood that each eccentric wheel has two opposite concentric portions, which are coincident with the larger and smaller adjoining concentric wheels, these concentric portions being connected by eccentric or cam-shaped sections over which the driving and driven wheels ride in passing from the radius of a smaller to that of a larger concentric wheel, or vice versa. The driving and driven wheels 1 2 are separated perpendicular to the axes of the shafts by a distance equal to the sum of the radii of the largest and smallest concentric wheels of the cones, while the separation parallel with the axes of the shafts is equal to the distance between the largest concentric wheel of one cone and the smallest concentric wheel of the other cone. Consequently while the driving-wheel is in engagement with one side of the smallest concentric wheel of its cone the driven wheel will be in engagement with the other side of the largest concentric wheel of its cone. The number of concentric wheels in each cone will be equal to the number of speeds which the gearing is designed to give. This number can be varied to suit the requirements of the particular use. The gearing illustrated is one having three concentric wheels in each cone, and consequently three different speed adjustments.

Since it is necessary in order to effect the shifting of the double cone with reference to both the driving and driven wheels simultaneously that the proper coincident portions between concentric and eccentric wheels should be opposite the driving and driven wheels at the same time, the two cones are so arranged on the cone-sleeve with relation to each other that when the driving-wheel is opposite a coincident portion for shifting from a larger to a smaller concentric wheel the driven wheel will be opposite a concentric portion for shifting from a smaller to a larger concentric wheel. It will be understood, therefore, that to shift the gearing from one point of speed adjustment to the other the cone-sleeve will be moved lengthwise on its supporting-shaft during the time that the driving and driven wheels are passing over portions of the concentric wheels with which they are in mesh, which are coincident with adjoining eccentric wheels. This movement will be sufficient to bring the driving and driven wheels into mesh with eccentric wheels, and the further rotation of the double cone will cause the driving and driven wheels to ride up and down (or down and up) on the eccentric wheels simultaneously until the opposite coincident portions of the eccentric wheels are reached, when the cone will be further moved in the same direction to bring the driving and driven wheels in mesh with the concentric wheels which are brought into operation for the next speed adjustment. During the time that the driving and driven wheels are passing over the eccentric or cam portions of the eccentric wheels the cone will swing the proper distance between the driving and driven shafts, (toward one and away from the other,) so as to accommodate for the change in the radial relations of the driving and driven wheels to the cones. By constructing the gearing with a double cone, which is shifted with relation to the driving and driven wheels, a double amount of speed variation will be secured for each adjustment of the gearing compared with a gearing having a single cone and the same amount of radial difference between the smallest and largest concentric wheels. The gearing is not only made more compact by this arrangement, but is also simplified over the gearing of my patent referred to.

I have provided for my gearing a simple and effective means for shifting the gearing to its different points of speed adjustment operative when the gearing is running in one direction only and applicable to uses where no reversal of the direction of rotation is required or where that reversal is effected by a reversing-gear receiving motion directly from the driving-shaft and thrown into operation when the variable gearing is thrown out or a reversing-gear located between the variable gear and the ultimate shaft to be driven. This shifting contrivance forms a part of the present invention and will now be described.

Upon each end of the cone-sleeve G is formed a shifting cam 3, which is cut on the surface of the sleeve, running out to its end and leaving the reduced circular end 4 of the sleeve intact. Each of these shifting cams is given the proper shape to effect the shifting movement during a single revolution of the cone-sleeve—that is to say, each is provided at its inner end with a section 5, which is oblique to the axis of the sleeve and which extends circumferentially a distance equal to the circumferential coincidence between the concentric and eccentric wheels of the cone. This is followed by a straight section 6 perpendicular to the axis of the cone-sleeve and extending circumferentially around the cone-sleeve a distance equal to the circumferential distance of one of the eccentric or cam portions of an eccentric wheel, and the cam is terminated by an oblique section 7, running out to the circular end 4 of the cone-sleeve and similar to the oblique section 5. The oblique sections 5 and 7 have an extension parallel with the axis of the cone-sleeve equal to the width of one of the wheels of the cone. Preceding the starting-incline 5, the cam is provided with a straight portion 8, which gives opportunity for dropping a shifting pin behind the cam-shoulder at the starting-point. It is evident with a shifting cam thus constructed that if a pin held against movement parallel with the axis of the cone-sleeve is dropped against the cam-shoulder at the point 8, as shown in dotted lines in Fig. 9, the cone-sleeve will be moved on its supporting-shaft while the oblique portions 5 and 7 are passing the shifting pin and will not be moved while the straight portion 6 is passing that pin, thus giving the necessary movements to the cone for shifting from one speed to another.

Figure 10:
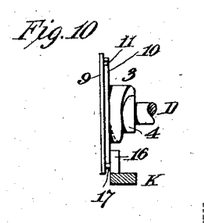
Figs. 10 and 11 are top views of one of the shifting cams and one of the drawing-in cams, showing two positions of the shifting and drawing-in pins which cooperate therewith.
Figure 11:
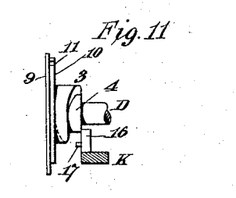

Mounted upon each end of the cone-sleeve just within the shifting cam and adjacent to the smallest wheel of each cone is a disk 9, having a shoulder 10 and a slot 11 opening out of that shoulder at the proper point and extending obliquely toward the axis of the cone-sleeve in a plane perpendicular to said axis. This device is a drawing-in cam for drawing the shifting pin positively into engagement with the shifting cam at the straight portion 8. Hung upon the controlling-shaft F, but keyed thereon by the key-block 12 so as to turn with said shaft, but capable of sliding movement thereon, is the shifting frame K. This is a rectangular frame which hangs down on one side of the cone-shaft D, the side bars of the frame being separated by a distance equal to the length of the cone-sleeve G. The lower cross-bar of the shifting frame K is provided with a locking-pin 13, engaging with the teeth 14 of a locking-rack on the swinging frame E, carrying the cone-shaft. A strap 15 limits the movement of the pin 13 when it is moved out of the spaces between the locking-teeth 14. Upon the side bars of the shifting frame K are mounted the shifting pins 16 and drawing-in pins 17. When the gearing is running at any one of its speed adjustments, the shifting pins 16 bear against the circular ends 4 of the cone-sleeve and hold the cone-sleeve against accidental sliding movement on its shaft, the pin 13 being locked in the teeth 14, carried by the frame E. To shift the gearing, the shifting frame K is swung away from the cone-shaft D until the shifting pins will clear the shifting cams and the locking-pin 13 is released from the teeth 14, when the frame K is moved sidewise until the drawing-in pin 17 on that side strikes the disk 9, preventing further side movement. The frame K being released will move toward the shaft D, causing the drawing-in pin 17 to rest on the shoulder 10 of the drawing-in cam, as shown in Fig. 10. As the cone revolves the drawing-in pin will be caught by the slot 11 and the frame K will be drawn toward the shaft D until the shifting pin 16 rests against the shifting cam at the straight portion 8. The further revolution of the cone will cause the inclined portions 5 and 7 and the straight portion 6 to pass the shifting pin, giving the cone the proper movement, when the shifting pin will drop off the end of the cam and ride against the circular end 4 of the cone-sleeve, as shown in Fig. 11. When the drawing-in pin 17 rests on the shoulder 10, the pin 13 is out of engagement with the teeth 14; but the drawing in of the shifting frame by the coöperation of the pin 17 and slot 11 draws the pin 13 into its proper space between the teeth 14, so that the shifting frame is held against side movement. The teeth 14 are long enough to permit the further movement required of the pin 13 when the shifting pin drops off the end of the shifting cam. The movement of the shifting frame K toward the cone-shaft D is assisted by a spring 18, extending from an arm secured to the controlling-shaft F to an arm on the swinging cone-frame E. During the swinging movement of the cone-frame E, which takes place while the driving and driven wheels are riding over the eccentric or cam portions of the eccentric wheels, the shifting frame K will swing with the cone-frame E and will maintain its proper relation to the cone-shaft.

To prevent the cone from shifting accidentally when the shifting frame is swung away from the cone-shaft, so as to disengage the pins 16 from the ends 4 of the shifting cams, and before such frame is again moved toward the cone-shaft, so as to engage one of its shifting pins with a shifting cam, I provide a special device which will now be described.

On the interior of the cone-sleeve G are a number of circular grooves 19, the number corresponding with the number of speed adjustments of the gearing. Located in a groove on one side of the shaft D and longitudinally thereof is a rod 20, carrying at its center a cam-shaped locking-shoe 21, which normally rests in a cross-slot in the shaft D, so as not to interfere with the sliding movement of the cone-sleeve on that shaft. One end of the rod 20 is connected by arms 22 23 with the controlling-shaft F. When the shifting frame is swung away from the cone-shaft, the shaft F is turned, and this results in the turning of the rod 20 through the arms 22 23, causing the locking-shoe 21 to be thrown out, so that its point will engage one of the grooves 19 on the inner side of the cone-sleeve, (see Fig. 7,) thus locking the cone-sleeve against accidental sliding movement on its shaft. When, however, the shifting frame is drawn toward the cone-shaft by the drawing-in cam and the shifting pin has reached its position against the shifting cam, the reverse turning movement of the shaft F will be sufficient to turn the shoe 21 out of the groove 19 and release the cone-sleeve.

To provide means for giving the shifting frame K its proper movements by an operating device located outside of the casing inclosing the gearing, the controlling-shaft F is extended through the casing L to any desired distance and is provided on its end with a yoke 24. A lever 25 is pivoted to one arm of this yoke and works in a slot formed in the other arm of the yoke. By raising this lever the shaft F can be turned to swing the frame. Connected with the lever 25 is a rod 26, extending longitudinally of the shaft F in the keyway and having its inner end 27 connected with the hub of the frame K, so that by swinging the lever 25 horizontally on its pivot the rod 26 will be moved lengthwise of the shaft F and will give the frame K the necessary sliding movement. To shift the gearing, therefore, by this means, it is only necessary to grasp the lever 25, raise it, and thus turn the shaft F and swing the frame K and then move the lever to the right or the left, according to whether the speed is to be increased or decreased, until the further movement of the lever is prevented by the striking of the pin 17 against the disk 9, when the lever 25 will be released, causing the pin 17 to drop upon the shoulder 10 and placing the parts in position to secure a shifting of the gearing.

It is desirable not to rely upon the thrust of the teeth of the driving and driven wheels upon the teeth of the cone-wheels to swing the cone or to maintain it in a proper position between the driving and driven wheels when the gearing is running at any point of speed adjustment. I have provided means, which form part of the present invention, for maintaining the position of the cone positively in both directions, so that the working of the gears on the pitch-line will be insured whether the gearing is running at one of its speed adjustments or is being shifted from one speed to another. To secure this result, I mount upon the cone-sleeve, preferably between the two cones, a cam-shaped disk 28, having the proper form and location, when rotated between abutments having fixed positions, to give the cone a positive swinging movement, such as is required when the driving and driven wheels are riding over the eccentric or cam portions of the eccentric wheels. The abutments coöperating with this cam-disk are provided by means of two series of disks 29 and 30, which are mounted to turn freely upon the driving and driven shafts A B. Adjoining the cam-disk 28 and between it and the cones are also mounted upon the cone-sleeve two circular disks 31 32, which likewise coöperate with the disks 29 30 and which hold the cone positively against swinging movement in either direction when the gearing is running at any one of its points of speed adjustment. The disks 29 30 coöperate with both the cam and the circular disks on the cone-sleeve, although the cam-disk and circular disks can be separated and be arranged to coöperate with separate sets of abutment-disks, as will be presently described.

Figure 1:
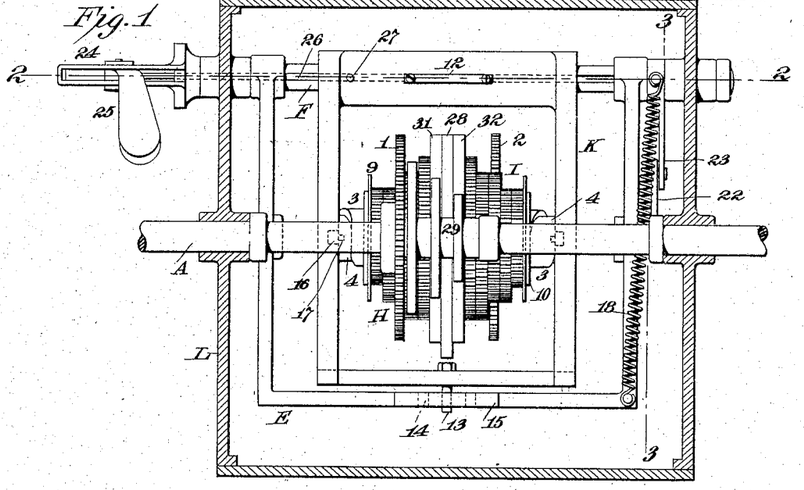
Figure 1 is a side elevation, with the casing in section, of a form of gearing embodying my present invention.
Figure 2:
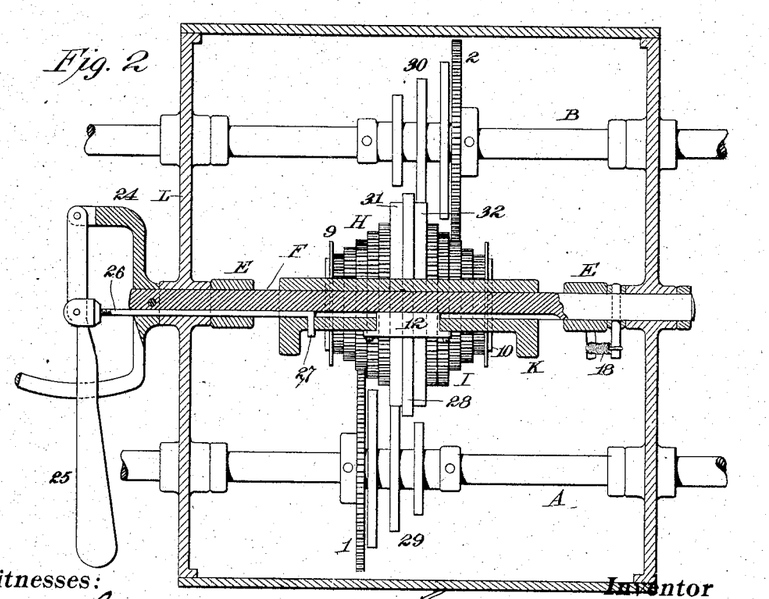
Fig. 2 is a horizontal section on line 2 2 in Fig. 1 looking down on the gearing and showing in section the devices for operating the shifting contrivance of the gearing.
Figure 3:
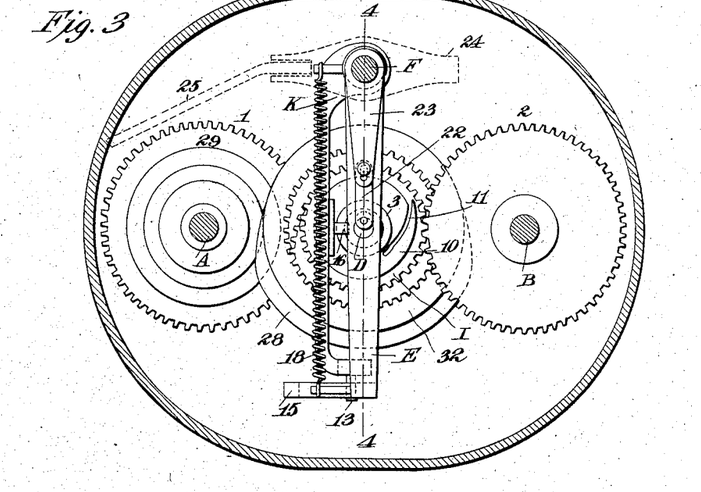
Fig. 3 is a vertical section on line 3 3 in Fig. 1, showing an end view of the gearing.
Figures 4, 5, 6, 7:
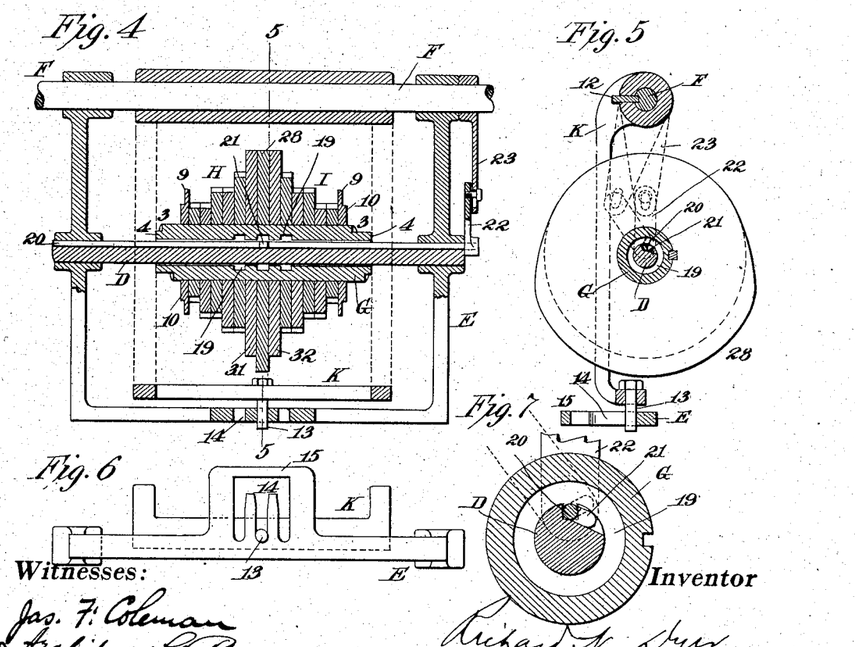
Fig. 4 is a vertical section on line 4 4 in Fig. 3.
Fig. 5 is a section at right angles to the section of Fig. 4, taken on line 5 5 in Fig. 4.
Fig. 6 is a view from the under side looking upwardly, showing the rack for locking the shifting frame.
Fig. 7 is a sectional view, on a larger scale, showing the shoe for locking the cone-sleeve when the latter is out of the control of the shifting frame.
Figure 8:
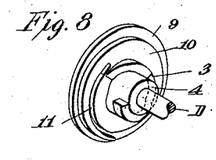
Fig. 8 is a perspective view of one end of the cone-sleeve, showing the shifting and drawing-in cams.
Figure 9:
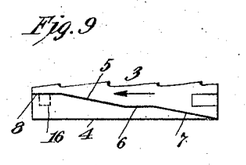
Fig. 9 is a view of one of the shifting-cams developed.
Figure 12:
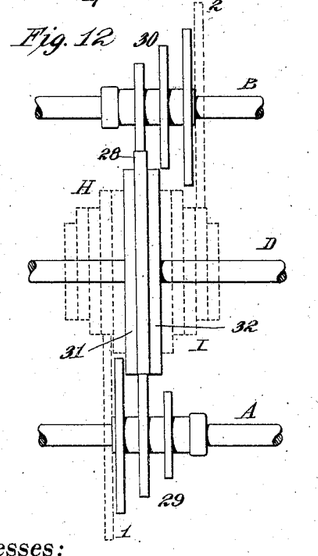
Figs. 12 and 13 are views showing the cam-disk on the cone in the extreme positions it takes when giving the cone a swinging movement.
Figure 13:
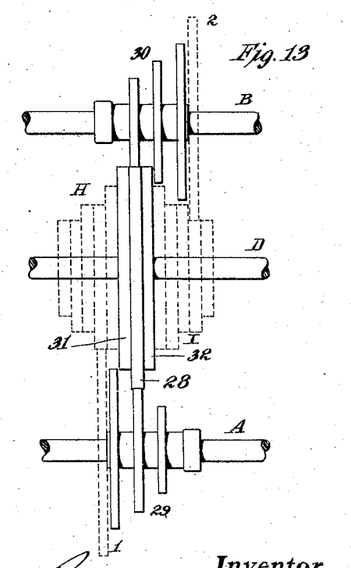

The sets of abutment-disks 29 and 30 are composed of disks of different sizes, their number being equal to the number of speed adjustments of the gearing. They therefore form collectively a double-stepped abutment, between which the cam and circular disks work and by which such disks are held or checked in both directions. Taking for illustration the sets of abutment-disks shown in Figs. 2, 12, and 13, composed each of three disks, it will be seen that the smallest disk of set 29 is opposite the intermediate disk of set 30, the intermediate disk of set 29 is opposite the smallest disk of set 30, while the largest disks of the two sets are not opposed by other disks. The distance between the intermediate disks of the sets 29 and 30 is equal to the diameter of the disks 31 32, and in running at the intermediate point of speed adjustment, as illustrated in Fig. 2, the disk 31 of the cone-sleeve will bear on the intermediate abutment-disk of set 29, while the disk 32 of the cone-sleeve will bear upon the intermediate abutment-disk of the set 30. The cone will thus be held in proper position for maintaining the mesh of the driving and driven gears at the pitch-line. Now if the gearing is to be shifted to its lowest speed, or that where the driving-wheel 1 engages with the largest wheel of the cone H and the driven wheel 2 engages with the smallest wheel of the cone I, the movement of the cone to the left to move the eccentric wheels under the driving and driven wheels will take place when the high point of the cam-disk 28 is opposite the smallest disk of set 30, while its low point is opposite the intermediate disk of set 29. The cone is then shifted to the left, bringing the cam-disk 28 between the intermediate disk of the set 29 and the smallest disk of the set 30, Fig. 12. The further revolution of the cone will cause the cam-disk 28, by the traveling of its high point away from the small disk of 30 and into contact with the intermediate disk of 29, to swing the cone toward the driven shaft B, as shown in Fig. 13, this swinging movement being exactly what is required to maintain the working of the gears at the pitch-line while the driving and driven gears are riding up and down on the eccentric wheels. While the high point of the cam 28 is running on the intermediate disk of set 29 and its low point on the smallest disk of set 30 the cone will be given its further movement to the left, causing the circular disk 31 to engage with the largest disk of the set 29 and the circular disk 32 to engage with the smallest disk of the set 30, while the cam-disk will occupy a position outside of the smallest disk of set 30 and between the largest and intermediate disks of set 29. This will give the slowest speed of the gearing. To adjust the gearing in the other direction, the cone will be shifted to the right when the highest part of the cam-disk 28 is opposite the intermediate disk of set 29 and its lowest part opposite the smallest disk of set 30. The cone will then be swung toward the shaft A by the cam action, and the further movement to the right will bring the circular disk 31 on the intermediate disk of set 29 and the circular disk 32 on the intermediate disk of set 30, while the cam-disk will occupy a position between the intermediate and smallest disks of the two sets 29 and 30.

In shifting the gearing from the intermediate speed to the point of highest speed the cone will be given its first movement to the right when the highest point of the cam-disk 28 is opposite the smallest disk of the set 29 and its lowest point is opposite the intermediate disk of set 30, causing the cam-disk 28 to be brought between the smallest disk of set 29 and intermediate disk of set 30. The further movement of rotation will cause the cone to be swung toward the shaft A, and while the highest point of the cam-disk 28 is still on the intermediate disk of the set 30 the cone will receive its second movement to the right, bringing the circular disk 31 in contact with the smallest disk of set 29 and circular disk 32 in contact with the largest disk of set 30. The cam-disk 28 will then be located outside of the smallest disk of set 29 to the right and between the intermediate and largest disks of set 30. In this way, it will be observed, the cone will not only be swung by a positive cam action working in both directions, but the mesh of the gears on the pitch-line will be maintained during this swinging movement, and in addition the mesh of the gears will be maintained on the pitch-line while the gearing is running at any one of its speed adjustments by a positive checking of the swinging movement in both directions.

Since the disks of the two sets of abutment-disks rotate in the same direction as the shafts A and B, but are loose thereon, the wear will be exceedingly slight, because these disks will furnish a rolling bearing on the circular and cam disks of the cone and will only have a movement on the shafts which support them sufficient to make up for the difference in speed between the shafts and the disks.

It is evident that many of the features of my invention which have already been described could be applied to the arrangement of gearing described in my patent already referred to, and it is also evident that many modifications of the gearing herein described could be made without departing from the essential principles of this invention. Without attempting to describe these different forms, but relying upon the scope of the claims hereinafter made to cover the features of the invention even when so applied or modified, I shall now refer to a few modifications which are illustrated in the annexed drawings.

Figure 14:
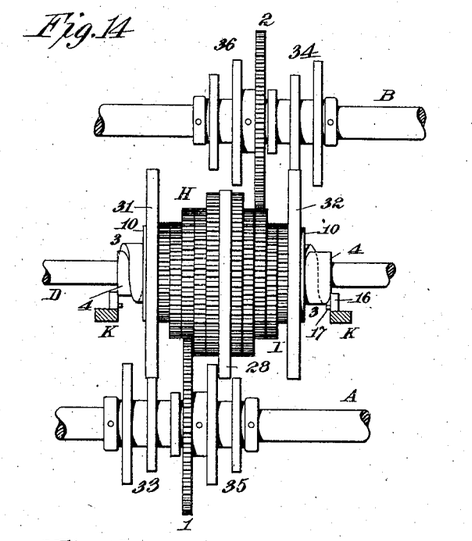
Fig. 14 is a top view, the shifting frame being in section, of a modified form of the gearing, illustrating a different arrangement of the devices for maintaining the working of the gears at the pitch-line both while the gearing is running at any one of its speed adjustments and while being shifted from one to another speed adjustment.

In Fig. 14 the circular disks 31 and 32 instead of being placed on opposite sides of the cam-disk 28 at the center of the cone are located at the end of the cone and coöperate with two sets of abutment-disks 33 34, sleeved upon the shafts A and B, or both sets of disks 33 and 34 could be placed opposite the circular cone-disk 31 or 32 and the other circular cone-disk be dispensed with. The cam-disk 28 is located at the center of the cone and coöperates with two sets of abutment-disks 35 36, which are sleeved on the shafts A and B, each set being composed for a three-speed gearing of only two disks. The operation of these parts will be understood from the description already made. This figure illustrates the separation of the function of the abutment-disks, disks being used for the camming action which are separate from the disks used to hold the cone while running at its different points of speed adjustment. The arrangement shown in Fig. 14 permits of a reduced separation between the shafts A and B, which separation has to be somewhat greater in the arrangement shown in the preceding figures to give proper clearances.

Figure 15:
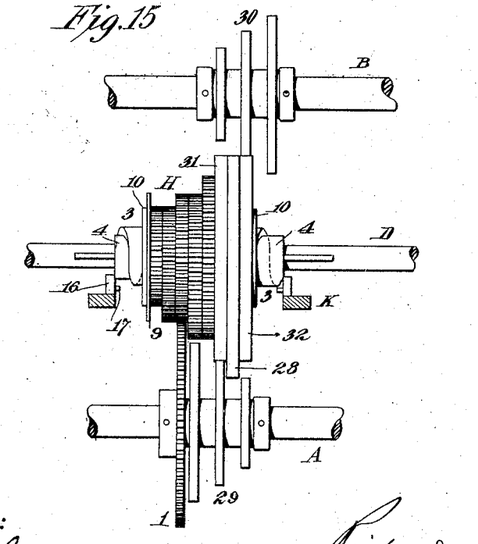
Fig. 15 is a view similar to Fig. 14, illustrating the employment of a single cone instead of a double cone of concentric and eccentric wheels.

In Fig. 15 is shown a single cone of concentric and eccentric wheels meshing with the driving-wheel on the shaft A, while the cone-sleeve is splined upon the shaft D, which is caused to rotate and from which power is taken in any suitable manner. In this arrangement the shaft B becomes an idle shaft, which simply supports the abutment-disks, the arrangement of abutment-disks shown for purposes of illustration being the same as shown in Figs. 1 to 13.

Figure 16:
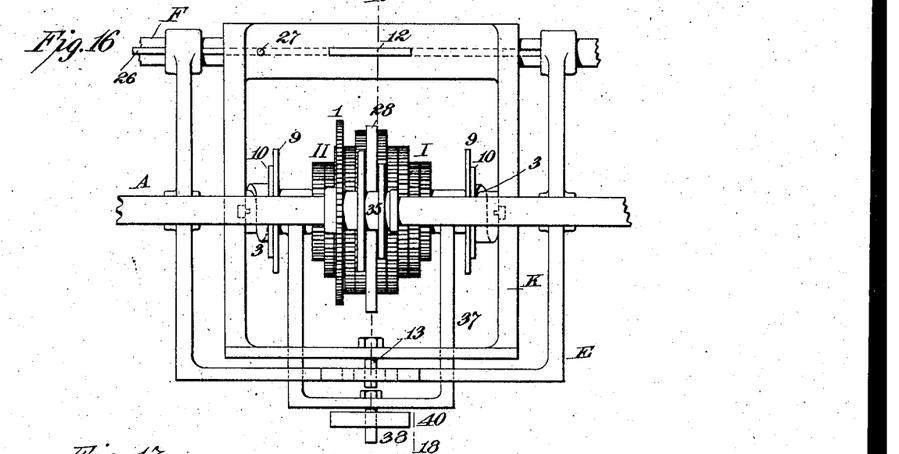
Fig. 16 is a side elevation of a form of gearing in which a specifically different means is employed for maintaining the working of the gears on the pitch-line at the different points of speed adjustment.
Figure 17:
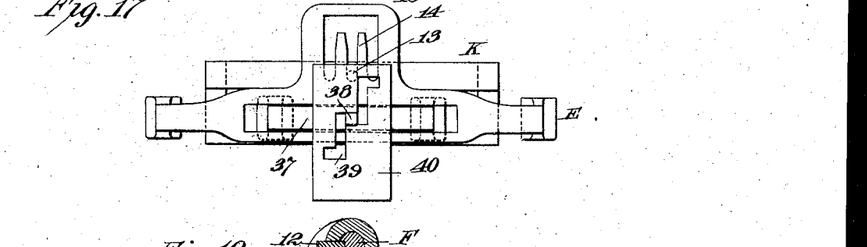
Fig. 17 is a view from the under side looking upwardly of the locking devices of Fig. 16, and Fig. 18 a vertical cross-section on line 18 18 in Fig. 16.
Figure 18:
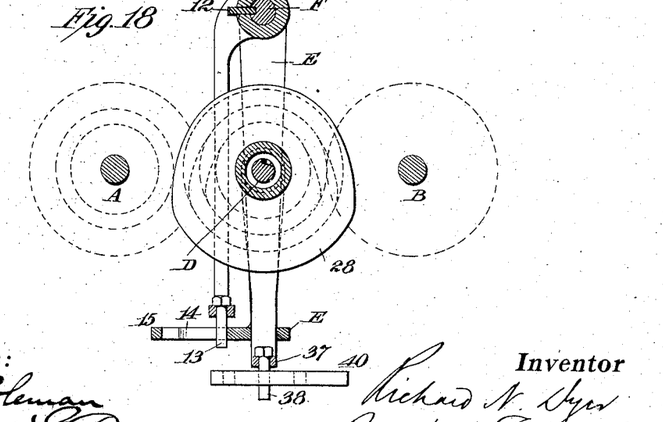

In Figs. 16, 17, and 18 a gearing is illustrated similar to that shown in Figs. 1 to 13; but instead of having circular disks on the cone-sleeve coöperating with abutment-disks for locking the cone at each point of speed adjustment the cone-sleeve is provided with a yoke 37, which passes through a slot in the lower cross-bar of the cone-carrying frame E and outside of said slot is provided with a pin 38, which works in the stepped slot 39 of a plate 40. The gearing is provided with a central cam-disk 28 on the cone, which coöperates with abutment-disks on the driving and driven shafts similar to abutment-disks 35 and 36 of Fig. 14, and this device is relied upon to produce the positive swinging movement of the cone and to maintain the mesh of the wheels at the pitch-line while the swinging movement takes place; but the mesh at the pitch-line while the driving and driven gears are in mesh with concentric wheels of the cone is maintained by the position of the pin 38 in the slot 39, as illustrated in Fig. 17. To make this more clear, I will state with reference to Fig. 17 that that figure shows the position of the pin 38 in the slot 39 while the gearing is at the intermediate speed. In shifting to a lower speed the movement of the cone to the left will move the pin 38 to the left, when the swinging of the cone will cause the pin 38 to travel along the slot 39 downwardly with reference to Fig. 17 until the lower end of the slot is reached, when the further movement of the cone to the left will push the pin 38 to the left in the slot 39 and will lock the frame E against further swinging movement.

In adjusting from the intermediate speed (illustrated in Fig. 17) to the highest speed of the gearing the pin 38 will be moved by the first movement of the cone to the right into the upwardly-extending section of the slot 39, when the swinging movement of the cone will cause the pin 38 to travel in the slot 39 to its upper end, and the further side movement of the cone to the right will cause the pin 38 to pass into the upper lateral branch of the slot 39, thus locking the frame E. While I have described the slot 39 and the movements of the pin 38 therein as if the plate 40 occupied a vertical position, as shown in Fig. 17, that plate, it will be understood, occupies, in fact, a horizontal position, as shown in Figs. 16 and 18.

What I claim is—

1. In a variable gearing of the type described, the combination with gear-wheels of different diameters, of driving and driven toothed wheels engaging such first-named wheels, and means for transferring the points of meshing of said driving and driven wheels with said wheels of different diameters simultaneously, one to a larger and the other to a smaller wheel without interruption in the transmission of power through the gearing, substantially as set forth.

2. In a variable gearing of the type described, the combination with concentric and eccentric toothed wheels, of driving and driven toothed wheels engaging such concentric and eccentric toothed wheels, such parts being relatively adjustable so that the driving-wheel will be caused to mesh with a larger concentric wheel at the same time that the driven wheel is caused to mesh with a smaller concentric wheel, whereby each adjustment of the gearing produces a double amount of variation in the speed relation of the driving and driven wheels, substantially as set forth.

3. In a variable gearing of the type described, the combination with two cones of concentric and eccentric toothed wheels, of driving and driven toothed wheels engaging the concentric and eccentric toothed wheels of the two cones, the power being transmitted from the driving-wheel through the two cones to the driven wheel and the parts being relatively adjustable so that the driving-wheel will be caused to mesh with a larger concentric wheel on one cone at the same time that the driven wheel is caused to mesh with a smaller concentric wheel on the other cone, substantially as set forth.

4. In a variable gearing of the type described, the combination with two cones of concentric and eccentric toothed wheels, of driving and driven toothed wheels engaging with the concentric and eccentric toothed wheels of the cones and separated by a fixed distance, the two cones of concentric and eccentric toothed wheels having a movement relative to the driving and driven wheels both parallel with and perpendicular to the axes of the wheels, substantially as set forth.

5. In a variable gearing of the type described, the combination with parallel driving and driven shafts having a fixed position, and driving and driven gear-wheels carried by such shafts, of the swinging element of the gearing, including gear-wheels of different diameters mounted between the driving and driven shafts and engaging the driving and driven gear-wheels, substantially as set forth.

6. In a variable gearing of the type described, the combination with parallel driving and driven shafts having a fixed position, and driving and driven gear-wheels carried by such shafts, of the swinging element of the gearing, including gear-wheels of different diameters, mounted between the driving and driven shafts and engaging the driving and driven gear-wheels, and means for transferring the points of meshing of said driving and driven wheels with said wheels of different diameters simultaneously, one to a larger and the other to a smaller wheel of the swinging element without interruption in the transmission of power through the gearing, substantially as set forth.

7. In a variable gearing of the type described, the combination with two cones of concentric and eccentric toothed wheels, of driving and driven toothed wheels engaging with the concentric and eccentric toothed wheels, the driving and driven wheels being fixed in position and the two cones of concentric and eccentric wheels being movable between the driving and driven wheels both parallel with and perpendicular to the axes of the wheels, substantially as set forth.

8. In a variable gearing of the type described, the combination with a driving or driven toothed wheel having a fixed position, of a cone of concentric and eccentric toothed wheels meshing with the driving or driven wheel, and a swinging shaft, such cone being mounted upon and movable longitudinally upon said shaft for permitting movements of the cone both perpendicular to and parallel with the axis of the driving or driven wheel to secure adjustment of the gearing to its two or more points of speed, substantially as set forth.

9. In a variable gearing of the type described, the combination with a single or double cone of concentric and eccentric toothed wheels movable longitudinally upon its supporting-shaft, of cams at the opposite ends of said cone, and pins or stops coöperating with said cams for shifting the cone, substantially as set forth.

10. In a variable gearing of the type described, the combination with a single or double cone of concentric and eccentric toothed wheels movable lengthwise upon its supporting-shaft, of shifting cams at the opposite ends of said cone, pins or stops coöperating with said shifting cams and a swinging and laterally-moving shifting frame carrying said pins or stops, substantially as set forth.

11. In a variable gearing of the type described, the combination with a single or double cone of concentric and eccentric toothed wheels movable lengthwise upon its supporting-shaft, of means for shifting the cone lengthwise to adjust the gearing to its different speeds, and means for locking the cone against accidental lengthwise movement while running at its different points of speed adjustment, substantially as set forth.

12. In a variable gearing of the type described, the combination with a single or double cone of concentric and eccentric toothed wheels movable lengthwise upon its supporting-shaft, of shifting cams at the opposite ends of said cone, such shifting cams terminating in circular ends, and pins or stops coöperating with said shifting cams and separated by a distance equal to the distance between the circular ends of said cams, such pins or stops bearing against the circular ends of the cams after the shifting movement is completed, whereby the cone will be held against accidental movement lengthwise while the gearing is running at any one of its speed adjustments, substantially as set forth.

13. In a variable gearing of the type described, the combination with a single or double cone of concentric and eccentric toothed wheels movable lengthwise upon its supporting-shaft, of shifting cams at opposite ends of the cone terminating in circular shoulders, shifting pins and a frame carrying said shifting pins having a swinging movement toward and away from the shifting cams and a sliding movement lengthwise of such cams, such shifting pins being separated by a distance equal to the separation of the circular shoulders at the ends of the two cams, substantially as set forth.

14. In a variable gearing of the type described, the combination with a shifting cam and coöperating pin or stop having a movement toward and away from the cam, of means for positively drawing the shifting pin into engagement with the shifting cam at the proper point and preventing its engagement at other points in the movement of said cam, substantially as set forth.

15. In a variable gearing of the type described, the combination with a shifting cam and coöperating pin or stop having a movement toward and away from the cam, of a drawing-in cam and coöperating pin for drawing the shifting pin into engagement with the shifting cam at the proper point, substantially as set forth.

16. In a variable gearing of the type described, the combination with a single or double cone of concentric and eccentric toothed wheels movable lengthwise upon its supporting-shaft, of shifting and drawing-in cams at the opposite ends of said cone, and shifting and drawing-in pins coöperating with said cams, substantially as set forth.

17. In a variable gearing of the type described, the combination with a single or double cone of concentric and eccentric toothed wheels movable lengthwise upon its supporting-shaft, of the shifting and drawing-in cams at the opposite ends of said cone, the shifting and locking pins, a frame carrying said pins having a swinging movement toward and away from the cams and a side movement with relation to said cams, and a lock for locking the said frame against side movement when swung toward the cams, substantially as set forth.

18. In a variable gearing of the type described, the combination with a single or double cone of concentric and eccentric toothed wheels movable lengthwise upon its supporting-shaft, of means for shifting the cone to and holding it at its several points of speed adjustment, and means for locking the cone against movement lengthwise of its supporting-shaft when released from the shifting and holding devices, substantially as set forth.

19. In a variable gearing of the type described, the combination of a single or double cone of concentric and eccentric toothed wheels movable lengthwise upon its supporting-shaft, and having a series of internal circular grooves, and a locking-shoe carried by the cone-supporting shaft and capable of movement into and out of the said circular grooves on the interior of the cone, substantially as set forth.

20. In a variable gearing of the type described, the combination with a single or double cone of concentric and eccentric toothed wheels mounted to move lengthwise on its supporting-shaft and having a series of circular grooves on its interior, of shifting cams at the opposite ends of said cone, a swinging and sliding frame carrying shifting pins coöperating with said shifting cams, a locking-shoe carried by the cone-supporting shaft and engaging with the grooves on the interior of the cone, and a connection between said locking-shoe and the swinging and sliding frame carrying the shifting pins, whereby the locking-shoe will be thrown outwardly to lock the cone against movement lengthwise when the shifting frame is swung outwardly to release the pins from the shifting cams, substantially as set forth.

21. In a variable gearing of the type described, the combination with the gearing and means for shifting the gearing having a swinging and sliding movement, of the casing and means extending outside the casing for said gearing for operating the shifting devices within the casing, substantially as set forth.

22. In a variable gearing of the type described, the combination with the shifting frame having a swinging and sliding movement, of a shaft upon which said frame is swung so as to turn with said shaft but be capable of sliding movement thereon, and a sliding rod extending lengthwise of said shaft and connected with said frame so as to slide it on said shaft, whereby the shifting frame can be given the required movements by rocking said shaft and sliding said rod, substantially as set forth.

23. In a variable-speed gearing of the type described, the combination with a driving or driven wheel having a fixed position, of a cone of concentric and eccentric toothed wheels mounted to move lengthwise on its supporting-shaft, a swinging frame carrying the cone-supporting shaft, shifting cams at the opposite ends of the cone, a shifting frame carrying shifting pins coöperating with said cams and having a swinging movement toward and away from said cams and a sliding movement sidewise thereof, and a locking-rack for locking the shifting frame to the cone-supporting frame when the shifting pins are in engagement with the shifting cams, substantially as set forth.

24. In a variable gearing of the type described, the combination with the two parallel shafts carrying driving and driven wheels having fixed positions, of the double cone of concentric and eccentric wheels, a stationary shaft upon which the eccentric wheels are supported, a swinging frame supporting said stationary shaft and located between the shafts carrying the driving and driven wheels, shifting and drawing-in cams on the opposite ends of said cone, the shifting cams terminating in circular shoulders, a swinging and sliding shifting frame carrying shifting and drawing-in pins coöperating with said cams, a locking pin and rack for locking the shifting frame to the cone-carrying frame when the former is swung toward the latter, a locking-shoe carried by a turning rod on the stationary cone-supporting shaft and coöperating with a set of circular grooves on the interior of the cone, and connections between the locking-shoe and the shifting frame so that the locking-shoe will be thrown outwardly to lock the cone when the shifting frame is swung away from the shifting cams, substantially as set forth.

25. In a variable gearing of the type described, the combination with the swinging element, of means for holding said element positively in both directions and independently of the mesh of the teeth of the gearing, while the gearing is running at any one of its speed adjustments, whereby the working of the gears on the pitch-line will be insured, substantially as set forth.

26. In a variable gearing of the type described, the combination with the swinging element, of means independent of the mesh of the teeth of the gearing for positively swinging said element and controlling the swinging movement in both directions, whereby the working of the gears on the pitch-line will be insured during the shifting of the gearing from one speed to another, substantially as set forth.

27. In a variable gearing of the type described, the combination with the swinging element, of means for holding the swinging element positively in both directions and independent of the mesh of the teeth of the gearing, both while the swinging element is at rest and is undergoing its swinging movement, whereby the working of the gearing at the pitch-line will be at all times insured, substantially as set forth.

28. In a variable gearing of the type described, the combination with the element having a swinging and sliding movement, of a double-stepped support for holding said element against swinging movement positively and in both directions at the two or more speed adjustments of the gearing, substantially as set forth.

29. In a variable gearing of the type described, the combination with the element of the gearing having a swinging and sliding movement, of a rotating cam carried by said element, and a double-stepped abutment with which said rotating cam coöperates for giving the element its swinging movement by the rotation of the cam between opposing steps of the abutment, substantially as set forth.

30. In a variable gearing of the type described, the combination with a single or double cone of concentric and eccentric toothed wheels mounted so as to have movements parallel with and perpendicular to its axis, of a cam carried by said cone, and two sets of rotatable disks of different sizes forming a double-stepped abutment with which said cam coöperates to produce the movements of the cone perpendicular to its axis, substantially as set forth.

31. In a variable gearing of the type described, the combination with a single or double cone of concentric and eccentric toothed wheels having movements parallel with and perpendicular to its axis, of one or more circular disks carried by said cone, and two sets of rotatable disks of different sizes forming a double-stepped abutment coöperating with the circular disk or disks of the cone to hold the cone positively in both directions against swinging movement while the gearing is running at any one of its speed adjustments, substantially as set forth.

32. In a variable gearing of the type described, the combination with a single or double cone of concentric and eccentric toothed wheels mounted so as to have movements parallel with and perpendicular to its axis, of a cam-disk carried by said cone, one or more circular disks likewise carried by said cone, and two or more sets of rotatable disks of different sizes forming double-stepped abutments with which the cam and circular disks coöperate, substantially as set forth.

33. In a variable-speed gearing of the type described, the combination of driving and driven wheels mounted upon parallel shafts and having a fixed position, a double cone of concentric and eccentric toothed wheels, a swinging frame carrying said double cone and located between the driving and driven wheels, said cone being movable lengthwise upon its supporting-shaft, a cam-disk and one or more circular disks carried by said cone, and two or more sets of rotatable disks of different sizes carried by the driving and driven shafts and coöperating with the cam and circular disks of the cone, substantially as set forth.

This specification signed and witnessed this 14th day of January, 1901.

RICHARD N. DYER.

Witnesses:
 JNO. R. TAYLOR,
 ARCHIBALD G. REESE.